United States Patent
Phan et al.

(10) Patent No.: US 12,089,041 B2
(45) Date of Patent: Sep. 10, 2024

(54) METHOD FOR AUTHENTICATION A SECURE ELEMENT COOPERATING WITH A MOBILE EQUIPMENT WITHIN A TERMINAL IN A TELECOMMUNICATION NETWORK

(71) Applicant: THALES DIS FRANCE SAS, Meudon (FR)

(72) Inventors: Ly-Thanh Phan, La Ciotat (FR); Mireille Pauliac, La Ciotat (FR)

(73) Assignee: THALES DIS FRANCE SAS, Meudon (FR)

( * ) Notice: Subject to any disclaimer, the term of this patent is extended or adjusted under 35 U.S.C. 154(b) by 110 days.

(21) Appl. No.: 17/423,506

(22) PCT Filed: Jan. 16, 2020

(86) PCT No.: PCT/EP2020/051045
§ 371 (c)(1),
(2) Date: Jul. 16, 2021

(87) PCT Pub. No.: WO2020/148397
PCT Pub. Date: Jul. 23, 2020

(65) Prior Publication Data
US 2022/0116777 A1   Apr. 14, 2022

(30) Foreign Application Priority Data

Jan. 18, 2019  (EP) .................................. 19305068

(51) Int. Cl.
*H04L 29/06* (2006.01)
*H04W 12/03* (2021.01)
(Continued)

(52) U.S. Cl.
CPC ......... *H04W 12/069* (2021.01); *H04W 12/03* (2021.01); *H04W 12/041* (2021.01); *H04W 12/0431* (2021.01); *H04W 12/10* (2013.01)

(58) Field of Classification Search
CPC .......... H04W 12/069; H04W 12/0431; H04W 12/03; H04W 12/041; H04W 12/10; H04L 9/08
See application file for complete search history.

(56) References Cited

U.S. PATENT DOCUMENTS 10,090,874 B2 * 10/2018 Madej .................. H04B 1/3816
2017/0134945 A1 * 5/2017 Goel ...................... H04W 48/18
(Continued)

FOREIGN PATENT DOCUMENTS

WO   2018169071 A1   9/2019

OTHER PUBLICATIONS

Technical Specification ETSI TS 133 501 V15.2.0 (Oct. 2018) 5G; Security architecture and procedures for 5G System (3GPP TS 33.501 version 15.2.0 Release 15), ETSI, France, pp. 1-172. (Year: 2018).*

(Continued)

*Primary Examiner* — Evans Desrosiers

(57) ABSTRACT

A system and method for authentication of a secure element cooperating with a Mobile Equipment forming a terminal in a telecommunication network is provided. The telecommunication network comprises a SEAF and a AUSF/UDM/ARPF. The method includes generating an anchor key ($K_{SEAF\_SRT}$) for the communication between the terminal and the SEAF according to 3GPP TS 33.501, wherein the anchor key ($K_{SEAF\_SRT}$) is indirectly derived from a key ($K_{SRT}$) obtained by deriving from the long-term key K and a secure registration token SRT sent by the terminal to the AUSF/UDM/ARPF and concealed with the AUSF/UDM/

(Continued)

ARPF public key along with its SUPI in the SUCI. Other embodiments are disclosed.

6 Claims, 4 Drawing Sheets

(51) Int. Cl.
*H04W 12/041* (2021.01)
*H04W 12/0431* (2021.01)
*H04W 12/069* (2021.01)
*H04W 12/10* (2021.01)

(56) References Cited

U.S. PATENT DOCUMENTS

2020/0001453 A1  1/2020  Hofmeister et al.
2022/0232442 A1* 7/2022  Hong ................ H04W 36/0011

OTHER PUBLICATIONS

Technical Specification ETSI TS 133 501 V15.2.0 (Oct. 2018) 5G; Security architecture and procedures for 5G System (3GPP TS 33.501 version 15.2.0 Release 15), ETSI, France, pp. 1-172. (Year: 2018) (Year: 2018).*

International Search Report (PCT/ISA/210) and Written Opinion (PCT/ISA/237) mailed on Mar. 19, 2020, by the European Patent Office as the International Searching Authority for International Application No. PCT/EP2020/051045 (WO2020/148397)—[13 pages].

"5G; Security Architecture and procedure for 5G System (3GPP TS 33.501 version 15.2.0 Release 15)"—ETSI Technical Specification, European Telecommunications Standards Institute (ETSI), 650, Route Des Lucioles ; F-06921 Sophia-Antipolis ; France.

"3 Generation Partnership Project ; Technical Specification Group Services and System Aspects; Security architecture and procedures for 5G system (Release 15)", 3GPP TS 33.501, 3rd Generation Partnership Project (3GPP), Mobile Competence Centre ; 650, Route Des Lucioles ; F-06921 Sophia-Antipolis Cedex ; France, vol. SA WG3, No. V15.3.1, Dec. 26, 2018 (Dec. 26, 2018); pp. 1-181, XP051591577, section 6.2.2.

Zuo Cong et al: "Hidden-Token Searchable Public-key Encryption", 2017 IEEE TRUSTCOM/BIGDATASE/ICESS, IEEE, Aug. 1, 2017 (Aug. 1, 2017), pp. 248-254, XP033151367, DOI: 10.1109/TRUSTCOM/BIGDATASE/ICESS.2017.244.

Examination Report from JP Patent Office for co-pending patent Application N°2021-541565 and English translation (6 pages).

* cited by examiner ced the XRES* with the HXRES* and $K_{AUSF}$ with $K_{SEAF}$ in the
METHOD FOR AUTHENTICATION A SECURE ELEMENT COOPERATING WITH A MOBILE EQUIPMENT WITHIN A TERMINAL IN A TELECOMMUNICATION NETWORK

BACKGROUND

Field

The invention concerns telecommunications, and more precisely, a method for authentication a secure element cooperating with a Mobile Equipment within a terminal in a telecommunication network. The invention concerns USIMs or more generally other xUICC products (embedded or not, like e-UICCs (embedded UICCs) or iUICCs (integrated UICCs)). xUICCs embed USIMs (Universal Sim applications).

Introduction

Passive eavesdropping is a critical issue in wireless telecommunication since the 3GPP inception. From 2G to 5G today, the integrity and confidentiality of the air interface relies on the secret key 'K' stored in the AUSF/UDM/ARPF system and the USIM. This secret key K (formerly called Ki in the 3GPP specifications related to 2G networks) is known under the name "long-term key K" in the 3GPP specification TS 33.501, for example the version V15.3.1 dated 2018-12 for 5G networks; this specification is hereby incorporated by reference in entirety into this application.

FIG. 1 represents a flowchart explaining how authentication typically occurs in a 5G environment. In this figure, several elements are shown:

A User Equipment 20 (UE or terminal), that is a Mobile Equipment (ME) cooperating with a secure element (USIM);

A SEAF 21 (Security Anchor Function) normally at the level of the serving network that may be a VPLMN (Visited Public Land Mobile Network) or the HPLMN;

An AUSF (Authentication Server Function, a UDM/ARPF 22 (Unified Data Management/Authentication Credential Repository and Processing Function). The AUSF/UDM/ARPF are at the level of an HPLMN 22 (Home Public Land Mobile Network).

The SEAF 21 receives intermediate key from the AUSF. The AUSF (HSS, EAP Server) interacts with the ARPF and terminates requests from the SEAF. It resides in an operator's network or a 3rd party system. The UDM/ARPF corresponds to an AuC (Authentication Centre). It stores the long-term security credentials and resides in an operator's Home Network domain system; TS 33.501, for example the version V15.3.1 dated 2018-12 describes how an authentication occurs, like represented in this figure (AKA—authentication and key agreement).

Different steps are represented (as described in § 6.1.3.2 of 3GPP TS 33.501), as follows:

At step 1, for each Nudm_Authenticate Get Request, the UDM/ARPF creates a 5G HE AV (Authentication Vector). The UDM/ARPF does this by generating an AV with the Authentication Management Field (AMF) separation bit set to "1" as defined in TS 33.102. The UDM/ARPF then derives $K_{AUSF}$ and calculate XRES*. Finally, the UDM/ARPF creates a 5G HE AV from RAND, AUTN, XRES*, and $K_{AUSF}$. At step 2, the UDM returns the 5G HE AV to the AUSF together with an indication that the 5G HE AV is to be used for 5G-AKA in a Nudm_UEAuthentication_Get Response. In case SUCI was included in the Nudm_UEAuthentication_Get Request, UDM will include the SUPI in the Nudm_UEAuthentication_Get Response. At step 3, the AUSF stores the XRES* temporarily together with the received SUPI. The AUSF may store the $K_{AUSF}$.

At step 4, the AUSF generates the 5G SE AV from the 5G HE AV received from the UDM/ARPF by computing the HXRES* from XRES* and $K_{SEAF}$ from $K_{AUSF}$, and replaces the XRES* with the HXRES* and $K_{AUSF}$ with $K_{SEAF}$ in the 5G HE AV. At step 5, the AUSF removes the $K_{SEAF}$ and returns the 5G SE AV (RAND, AUTN, HXRES*) to the SEAF in a Nausf_UEAuthentication_Authenticate Response. At step 6, the SEAF sends RAND, AUTN to the UE via an AMF (not represented here) in a NAS message Authentication-Request. This message can also include the ngKSI that will be used by the UE (ME collaborating with a USIM) and the AMF to identify the $K_{AMF}$ and the partial native security context that is created if the authentication is successful. The ME shall forward the RAND and AUTN received in NAS message Authentication Request to the USIM.

At step 7, at receipt of the RAND and AUTN, the USIM verifies the freshness of the 5G AV by checking whether AUTN can be accepted as described in TS 33.102. If so, the USIM computes a response RES. The USIM returns RES, CK, IK to the ME. If the USIM computes a Kc (i.e. GPRS Kc) from CK and IK using conversion function c3 as described in TS 33.102, and sends it to the ME, then the ME shall ignore such GPRS Kc and not store the GPRS Kc on USIM or in ME. The ME then computes RES* from RES. The ME calculates $K_{AUSF}$ from CK∥IK. The ME shall calculate $K_{SEAF}$ from $K_{AUSF}$. At step 8, the UE returns RES* to the SEAF in a NAS message Authentication Response. At step 9, the SEAF computes HRES* from RES* and the SEAF compares HRES* and HXRES*. If they coincide, the SEAF considers the authentication successful from the serving network point of view.

At step 10, the SEAF sends RES*, as received from the UE, in a Nausf_UEAuthentication_Authenticate Request message to the AUSF. At step 11, the AUSF receives as authentication confirmation the Nausf_UEAuthentication_Authenticate Request message including a RES*. If the RES* and XRES* are equal, the AUSF considers the authentication as successful from the home network point of view. AUSF informs UDM about the authentication result. At step 12, the AUSF indicates to the SEAF in the Nausf_UEAuthentication_Authenticate Response whether the authentication was successful or not from the home network point of view. If the authentication was successful, the $K_{SEAF}$ is sent to the SEAF in the Nausf_UEAuthentication_Authenticate Response. In case the AUSF received a SUCI from the SEAF in the authentication, and if the authentication was successful, then the AUSF also includes the SUPI in the Nausf_UEAuthentication_Authenticate Response message.

If the authentication was successful, the key $K_{SEAF}$ received in the Nausf_UEAuthentication_Authenticate Response message becomes the anchor key in the sense of the key hierarchy. Then the SEAF derives the $K_{AMF}$ from the $K_{SEAF}$. If a SUCI was used for this authentication, then the SEAF shall only provide ngKSI and $K_{AMF}$ to the AMF after it has received the Nausf_UEAuthentication_Authenticate Response message containing SUPI; no communication services will be provided to the UE until the SUPI is known to the serving network.

FIG. 2 represents how a SUCI (Subscription Concealed Identifier) may be generated. The SUCI contains at least the MCC/MNC (Mobile Country Code/Mobile Network Code)

codes in clear and the MSIN (Mobile Subscriber Identifier) encrypted with the public key of the home network. When the home network receives the SUCI, it deciphers it thanks to its Subscription Identifier De-concealing Function (SIDF) with its private key to retrieve the MSIN (asymmetric key solution) and thus retrieve the SUPI out of the SUCI. So the SUCI is a partially encrypted SUPI (Subscription Permanent Identifier). The format of the SUCI is specified in 3GPP TS 23.003. An example of how the SUCI is computed by the UE is provided in 3GPP TS 33.501.

FIG. 3 represents how an AUTN message is generated and the resulting AV.

SUMMARY

In a 3G, 4G or 5G device and network authentication process, a Random Challenge (RAND) is first generated by the AUSF/UDM/ARPF, as well as the authentication token (AUTN) based on the pre-shared secret key K and the Random Challenge RAND. On the other side of the point-to-point authentication, the USIM has to compute a response based on the Random Challenge (RAND) received from the AUSF/UDM/ARPF and its own pre-shared secret key K. The USIM also computes an expected authentication token (XAUTN) that it verifies is equal to the one (AUTN) received from the AUSF/UDM/ARPF, before returning its computed response to the AUSF/UDM/ARPF. The AUSF/UDM/ARPF then verifies the USIM response to its expected response to validate the USIM identity. Keys are then generated on both sides of the communications in order to protect the integrity and confidentiality of the air interface based on the pre-shared secret key K and the Random Challenge exchanged between the parties.

The caveat in such process is its sensitivity to the pre-shared secret key K. It is assumed in practice that the pre-shared key K secret is well kept in the 3GPP entities (during transit and in storage) and in the USIM. However, under the hypothesis that the key K may be compromised outside of this real situation (e.g. during transit between the USIM manufacturer and the AUSF/UDM/ARPF), and the malicious party uses its knowledge of the key K to passively eavesdrop communications on the air interface. The problem is therefore that the existing authentication process and the following confidentiality and integrity protection mechanisms enables the malicious third party to eavesdrop the communication by catching the Random Challenge over the air interface and then be able to compute the confidentiality protection key from that Random Challenge and the key K of its knowledge. The malicious third party can then decipher with the computed confidentiality protection key all following communications over the air interface. It is also assumed that the identity of the subscription that is under attacked can be guessed by the attacker (e.g. by knowing the identity of the target, its telephone number, IMSI written on its SIM card, etc. . . . ).

In 2G/3G/4G and 5G when identity privacy mechanism is not active, it is possible for the attacker to capture the subscription identity over the air interface during the initial registration/attachment of the device to the network. In 5G, when the user identity privacy mechanism is used, the identity of the subscription/user is encrypted with the AUSF/UDM/ARPF public key, and only by indirect process, the malicious third party can guess the user/subscription identity.

Several solutions are contemplated to prevent such passive eavesdropping with a compromised key K outside of the 3GPP realm.

In a first solution, by implementing a Diffie-Hellmann mechanism between the terminal and the Serving Network, it would be possible to prevent passive eavesdropping of the air interface by the malicious third party as described in U.S. Pat. No. 9,787,661 B2. The drawbacks of such a solution are:

It requires changes to be made at the level of the terminal, the Visited Network (MME/AMF) and the home network (HSS or UDM/AUSF/ARPF);

It requires additional public key encryption in the Mobile Equipment part of the terminal.

A second solution is to be able to replace frequently the long term key. The frequency can be as high as at each authentication. The risk of desynchronization between the device and the home network key store is higher as the frequency of change increases, and thus requires synchronization mechanism to be in place. Furthermore, if the change of the key relies on the initial key K and a token that is sent in clear or can be deduced based on the key K, then the malicious third party would be able to deduce the new keys.

A third solution is to pre-store several keys in the USIM so that once a key is considered compromised, it is possible to switch to another as described in WO 2016/207316. However the problem becomes more challenging for the malicious third party, as it was able to capture one key, one could assume that it would be able to capture the other keys.

The present invention proposes a few solutions to the problems associated with the contemplated solutions, as follows.

In a first embodiment, a method for the authentication of a secure element cooperating with a Mobile Equipment within a terminal in a telecommunication network is provided. The telecommunication network comprises a SEAF and a AUSF/UDM/ARPF. The method consists of generating an anchor key ($K_{SEAF\_SRT}$) for the communication between the terminal and the SEAF according to 3GPP TS 33.501, wherein the anchor key is indirectly derived from a key ($K_{SRT}$) obtained by derivation from the long-term key K and a secure registration token SRT sent by the terminal to the AUSF/UDM/ARPF and concealed with the AUSF/UDM/ARPF public key along with its SUPI in the SUCI.

In a second embodiment, a secure element intended to cooperate with a Mobile Equipment within a terminal in a telecommunication network is provided. The telecommunication network comprises a SEAF and a AUSF/UDM/ARPF. The secure element generates a secure registration token (SRT) sent by the terminal to the AUSF/UDM/ARPF and concealed with the AUSF/UDM/ARPF public key along with its SUPI in the SUCI, in order that AUSF/UDM/ARPF generates an anchor key ($K_{SEAF\_SRT}$) for the communication between the terminal and the SEAF according to 3GPP TS 33.501, wherein the anchor key ($K_{SEAF\_SRT}$) is derived from a key ($K_{SRT}$) obtained by deriving the long-term key K by the secure element and a secure registration token (SRT) sent by the terminal to the AUSF/UDM/ARPF and concealed with the AUSF/UDM/ARPF public key along with its SUPI in the SUCI.

In a third embodiment, an AUSF/UDM/ARPF of a telecommunication network comprising a SEAF and a secure element intended to cooperate with a Mobile Equipment within a terminal in the telecommunication network is provided. The AUSF/UDM/ARPF receives a secure registration token (SRT) sent by the secure element along with its SUPI concealed in the SUCI, in order that the AUSF/UDM/ARPF generates an anchor key ($K_{SEAF\_SRT}$) for the communication between the terminal and the SEAF according to 3GPP TS 33.501, wherein the anchor key ($K_{SEAF\_SRT}$) is derived from a key ($K_{SRT}$) obtained by deriving the long-term key K by the secure element and a secure registration token (SRT) sent by the terminal to the AUSF/UDM/ARPF and concealed.

BRIEF DESCRIPTION OF THE DRAWINGS

The features of the present invention, which are believed to be novel, are set forth with particularity in the appended claims. The invention, together with further objects and advantages thereof, may best be understood by reference to the following description, taken in conjunction with the accompanying drawings, in the several figures of which like reference numerals identify like elements, and in which:

DETAILED DESCRIPTION

Figure 1:
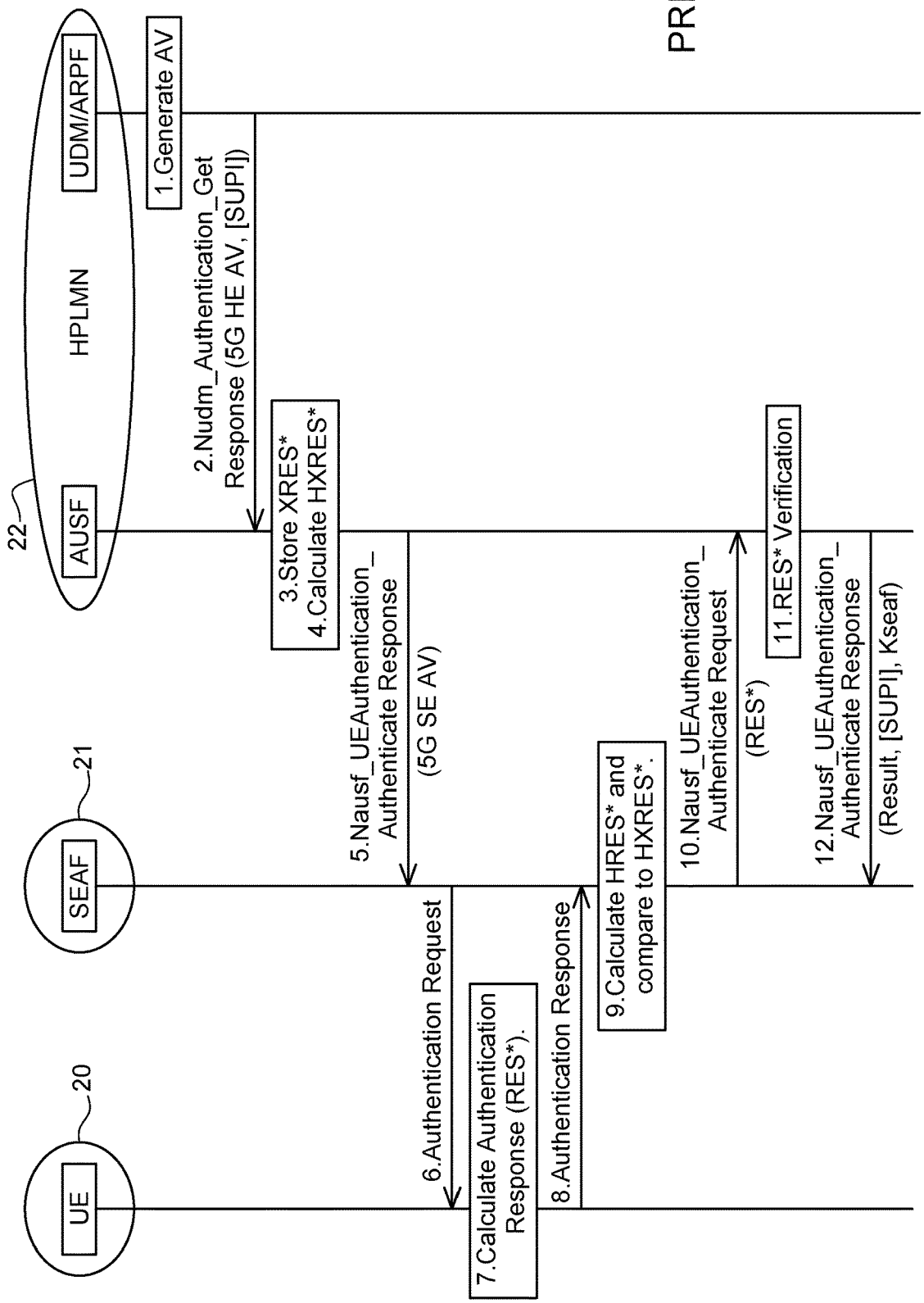
FIG. 1 illustrates a flowchart explaining how authentication typically occurs in a 5G environment.
Figure 2:
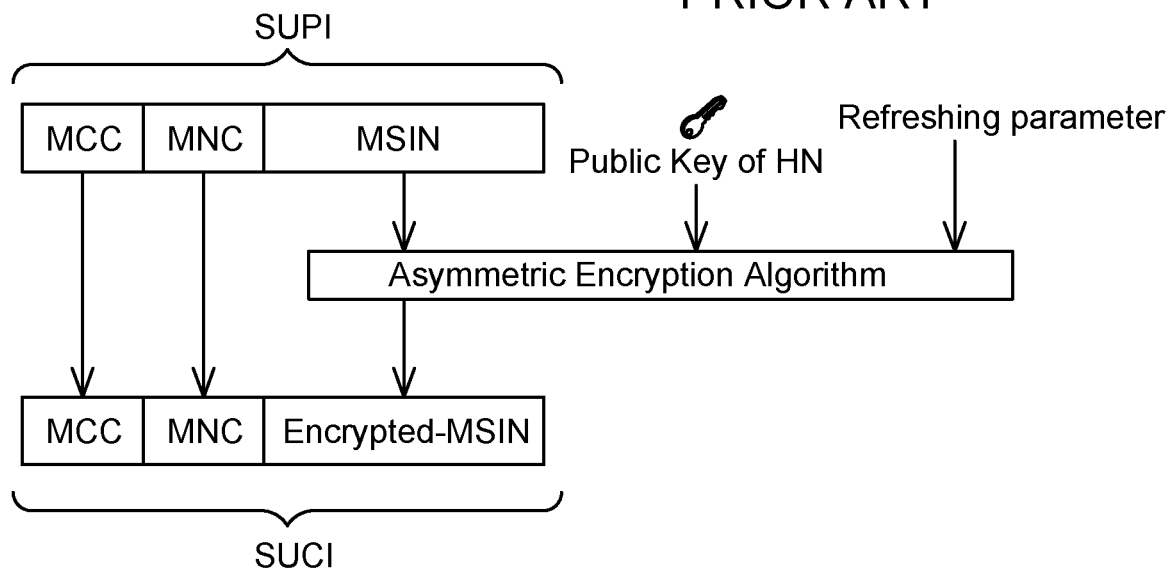
FIG. 2 illustrates how a SUCI (Subscription Concealed Identifier) may be generated.
Figure 3:
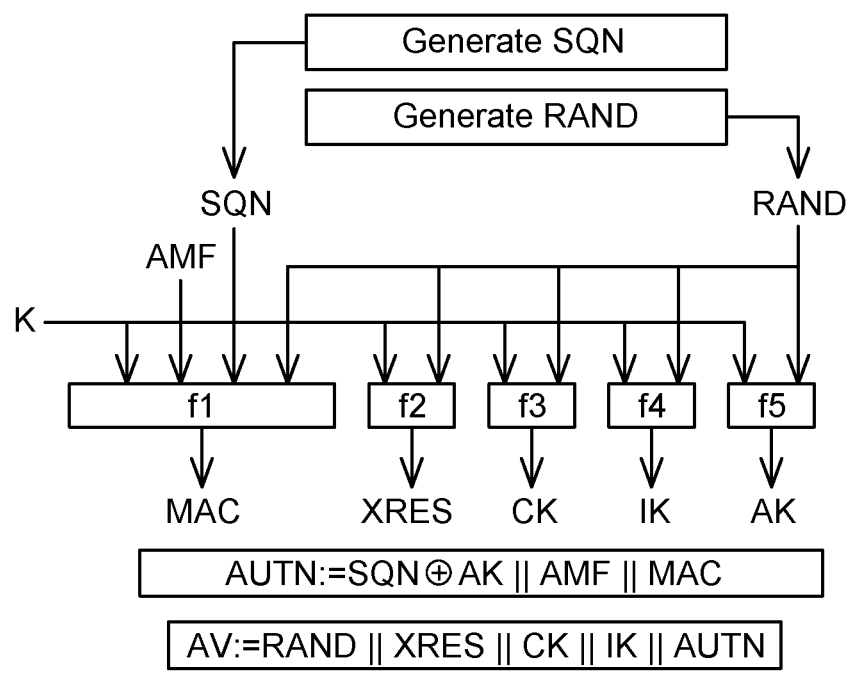
FIG. 3 illustrates how an AUTN message is generated and the resulting AV.

While the specification concludes with claims defining the features of the invention that are regarded as novel, it is believed that the invention will be better understood from a consideration of the following description in conjunction with the drawing figures, in which like reference numerals are carried forward.

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting but rather to provide an understandable description of the invention.

For the purpose of this document the expressions terminal and User Equipment (UE) are used undifferentiated. The terminal or UE is composed of a Mobile Equipment and a secure element (xUICC) cooperating with the Mobile Equipment.

A list of acronyms referenced herein is provided, also available from the 3GPP specification TS 33.501, for example the version V15.3.1 dated 2018-12 for 5G networks, already incorporated by reference into this application in a preceding section.

ACRONYMS

Figure 4:
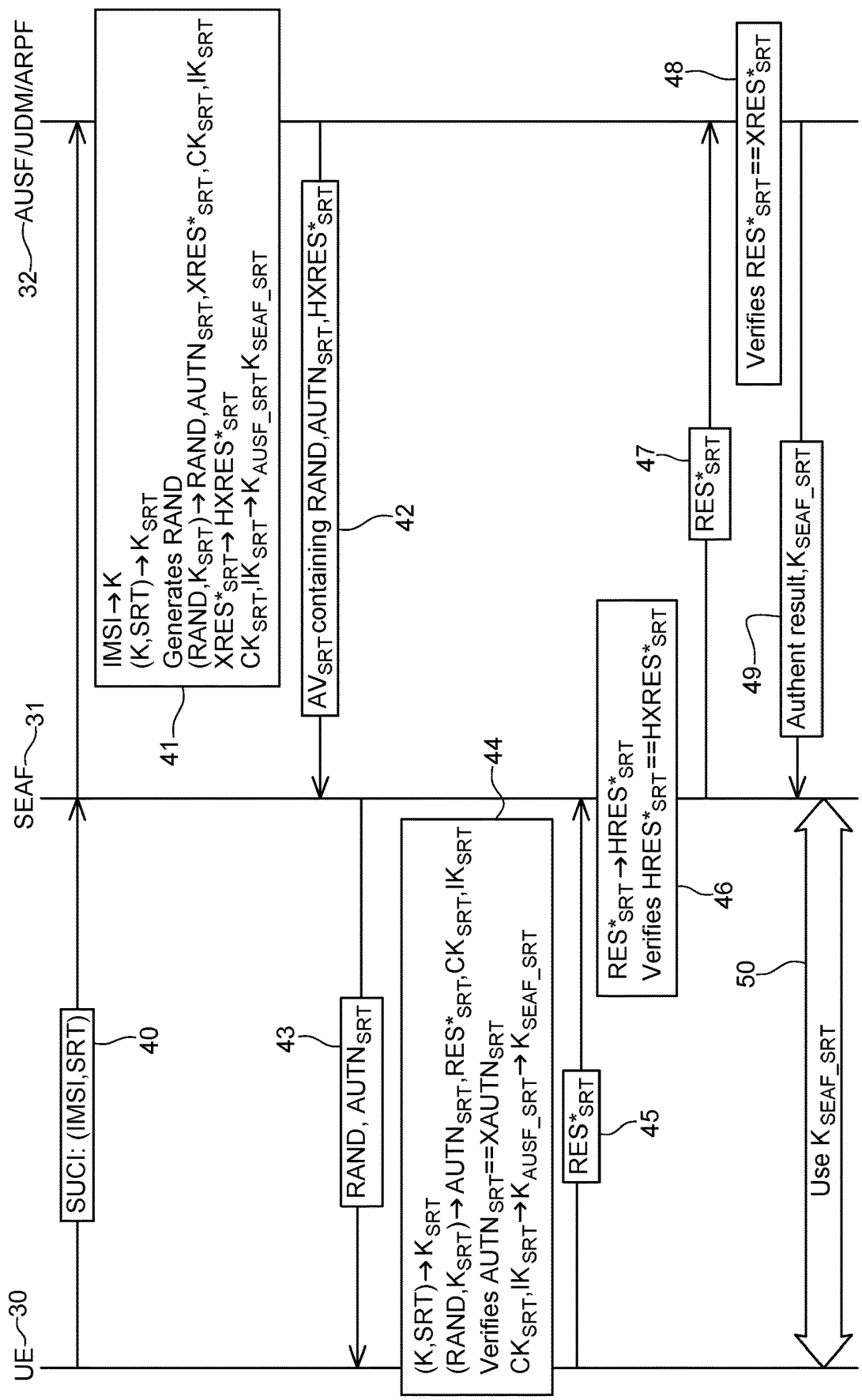
FIG. 4 illustrates a first preferred embodiment of the invention, wherein a UE cooperating with an improved secure element exchanges messages with a SEAF and an improved AUSF/UDM/ARFP.

AK—Anonymity Key
AKA—authentication and key agreement
AMF—Authentication Management Field
ARPF—Authentication Credential Repository and Processing Function
AUSF—Authentication Server Function
AV—Authentication Vector
CK—Cipher Key
HRES—Hash Response
HXRES—Hash Expected Response
IK—Integrity Key
MAC—Message Authentication Code
ME—Mobile Equipment
RAND—Random
RES—Response
SEAF—Security Anchor Function
SUCI—Subscription Concealed Identifier
SUPI—Subscription Permanent Identifier
SRT—Secure Registration Token
SQN—Sequence Number Counter
UDM—Unified Data Management
UE—User Equipment
USIM—Universal SIM
XAUTN—Expected Authentication Token
XRES—Expected Response FIG. 4 illustrates a first preferred embodiment, wherein a UE cooperating with an improved secure element exchanges messages with a SEAF and an improved AUSF/UDM/ARFP.

In this figure, a UE 30 composed of a Mobile Equipment (ME) cooperating with an improved secure element exchanges messages with a SEAF 31 (identical to SEAF 21 of FIG. 1) and an improved AUSF/UDM/ARFP 32.

The principle embodiments of the invention rely on deriving the pre-share secret key K based on a secure registration token (SRT) sent by the UE 30 (USIM) to the AUSF/UDM/ARPF 32, encrypted with the AUSF/UDM/ARPF 32 public key. Preferably, the secure registration token is a random number.

In a first step 40, the UE 30 sends to the AUSF/UDM/ARPF 32 through the SEAF 31 a SUCI comprising at least the MCC/MNC codes of the AUSF/UDM/ARPF 32, the MSIN and the secure registration token SRT cyphered with the public key of the AUSF/UDM/ARPF 32 and a key identifier of the key (for example for each one of a group of users). The secure registration token is preferably generated by the secure element.

The SUPI is for example an IMSI or a Network Specific identity in the form of a Network Access Identifier. For the purpose of this document IMSI and SUPI are used interchangeably and undifferentiated. The SRT is for instance a random number or a sequence number (this sequence number has been increased prior to this process). The SRT is concealed, along with the SUPI, in the SUCI by the public key of the AUSF/UDM/ARFP 32. So, the SRT is encrypted. In a second step 41, the AUSF/UDM/ARFP 32, upon reception of the registration message, retrieves the subscriber identity (the IMSI) and the SRT. From the IMSI, it retrieves the long-term key K associated to this IMSI.

Then, the AUSF/UDM/ARFP 32 generates thanks to the long-term key K and the SRT a key $K_{SRT}$. So $K_{SRT}$ is derived from the long-term key K and SRT.

The AUSF/UDM/ARFP 32 then generates a random challenge RAND and from $K_{SRT}$ and RAND, generates an $AUTN_{SRT}$, a first expected challenge response $XRES*_{SRT}$ and keys $CK_{SRT}$ (for confidentiality protection) and $IK_{SRT}$ (for integrity protection). From the first expected challenge response $XRES*_{SRT}$ the AUSF/UDM/ARFP 32 generates a second expected challenge response $HXRES*_{SRT}$. From the keys $CK_{SRT}$ and $IK_{SRT}$, the AUSF/UDM/ARFP 32 generates an anchor key ($K_{SEAF\_SRT}$) for the communication between the terminal 30 and the SEAF 31 according to 3GPP TS 33.501, wherein the anchor key is derived from an intermediate key $K_{AUSF\_SRT}$ obtained from the keys $CK_{SRT}$ and $IK_{SRT}$.

The AUSF/UDM/ARPF 32 then sends at step 42 an authentication vector $AV_{SRT}$ to the SEAF 31 containing RAND, $AUTN_{SRT}$ and $HXRES*_{SRT}$. At step 43, the SEAF 31 stores locally the authentication vector and sends to UE 30 the RAND and authentication token $AUTN_{SRT}$. The UE 30 then generates on its side, like the AUSF/UDM/ARFP 32, $K_{SRT}$, the authentication token $AUTN_{SRT}$, $RES*_{SRT}$, $CK_{SRT}$ and $IK_{SRT}$. It verifies also if $AUTN_{SRT}$ equals $XAUTN_{SRT}$ and generates $K_{AUSF\_SRT}$ from the keys $CK_{SRT}$ and $IK_{SRT}$ and therefrom $K_{SEAF\_SRT}$.

So, at this step 44, the UE 30 verifies the validity of the received challenge RAND and authentication token $AUTN_{SRT}$, this validity verification being performed by the terminal UE 30 by:

- Deriving a registration key $K_{SRT}$ based on the locally stored secure registration token SRT and the locally stored long-term key K,
- Computing locally expected $XAUTN_{SRT}$ based on the terminal locally stored long-term key and the SRT,
- Checking the expected $XAUTN_{SRT}$ is equal to the received $AUTN_{SRT}$ from the SEAF 31;
- If this checking is successful ($AUTN_{SRT}$ equals $XAUTN_{SRT}$), the terminal 30 computes the challenge response $RES*_{SRT}$ based on the terminal key $K_{SRT}$ computed previously and the received challenge RAND;
- The terminal 30 generates another anchor key $K_{SEAF\_SRT}$ for the communication between the terminal 30 and the SEAF 31 according to 3GPP TS 33.501, wherein the anchor key is indirectly derived from $K_{SRT}$ obtained by derivation from the terminal 30 long-term key K and the secure registration token SRT.

The check of $XAUTN_{SRT}$ being equal to $AUTN_{SRT}$ is a shortcut in this description. In fact, the USIM realizes the following steps:

- It computes the value of the SQN from the content of the AUTN;
- It computes XMAC;
- It verifies if XMAC is equal to MAC;
- It verifies the validity of the SQN.

At the next step 45, the UE 30 sends to the SEAF 31 the challenge response $RES*_{SRT}$ computed by the UE 30. At step 46, the SEAF 31 derives another $HRES*_{SRT}$ from the received $RES*_{SRT}$ and verifies that the $HRES*_{SRT}$ is equal to the $HXRES*_{SRT}$ contained in the locally stored authentication vector in step 42. If this verification step is successful, the SEAF 31 sends at step 47 the successfully checked $RES*_{SRT}$ to the AUSF/UDM/ARPF 32.

At step 48, the AUSF/UDM/ARPF 32 verifies that said received $RES*_{SRT}$ from AUSF 31 is equal to the expected challenge response $XRES*_{SRT}$ computed before. If they correspond, the AUSF/UDM/ARPF 32 considers that the UE 30 is authenticated and sends at step 49 the authentication result and the $K_{SEAF\_SRT}$ to the SEAF 31, this authentication result indicating the status of the authentication of the terminal 30 accordingly to 3GPP TS 33.501. After that, the SEAF 31 and the UE 30 can use the anchor key $K_{SEAF\_SRT}$ for communication as specified in 3GPP TS 33.501.

As thus explained, the embodiment of the invention above relies on the use of an anchor key $K_{SEAF\_SRT}$ generated by the UE 30 indirectly derived from a key $K_{SRT}$ obtained by derivation from the long-term key K and a secure registration token SRT sent by the secure element/terminal 30 to the AUSF/UDM/ARPF 32 and concealed with the AUSF/UDM/ARPF public key along with the terminal/secure element SUPI in the SUCI.

Figure 5:
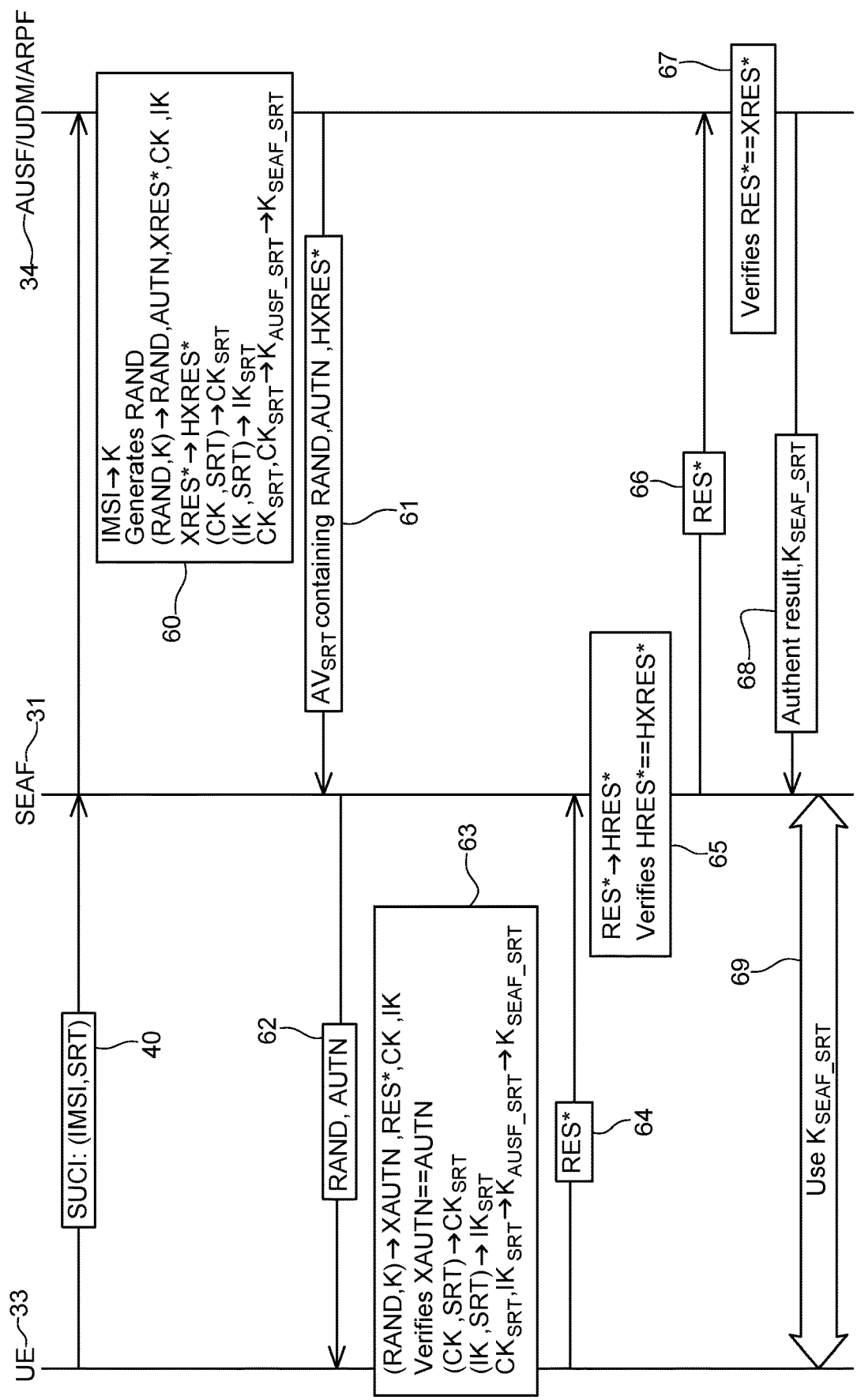
FIG. 5 illustrates a second preferred embodiment of the invention, comprising same elements as in FIG. 4, but where the UE and the AUSF/UDM/ARPF have another behavior, thereby performing different method steps than those of the UE and the AUSF/UDM/ARPF shown in FIG. 4.

FIG. 5 illustrates a second preferred embodiment, comprising same elements as in FIG. 4, but where the UE and the AUSF/UDM/ARPF have another behavior, thereby performing different method steps than those of the UE and the AUSF/UDM/ARPF shown in FIG. 4.

The SEAF 31 is the same as in FIG. 4 but the UE and the AUSF/UDM/ARPF are referenced 33 and 34 respectively as they have another behavior: At step 40, the UE 33 sends to the AUSF/UDM/ARPF 34 the same SUCI as in FIG. 4. This means that the UE 33 generates and sends a secure registration token (SRT), the SRT being for instance a random number or a sequence number, the sequence number having been increased prior to this process. The terminal 33 tries to register to the AUSF/UDM/ARPF 34 by sending the terminal SUCI containing encryption of in addition to the subscriber identity (SUPI), the secure registration token SRT through the SEAF 31.

At step 60, the AUSF/UDM/ARPF 34, upon reception of the registration message retrieving the terminal identity and the SRT, retrieves the long-term key K associated with the subscriber identity (IMSI or another unique reference of the secure element/terminal). The AUSF/UDM/ARPF 34 then generates a random challenge RAND. It derives from the long-term key K and the RAND, the authentication token AUTN, the expected challenge response XRES*, ciphering key CK, integrity key IK and a second expected challenge response HXRES*, the HXRES* being derived from first expected challenge response XRES* as specified in 3GPP TS 33.501.

The AUSF/UDM/ARPF 34 then generates a second ciphering key $CK_{SRT}$ and a second integrity key $IK_{SRT}$, the second ciphering key being derived from the first ciphering key and the SRT, and the second integrity key being derived from the first integrity key and the SRT. The AUSF/UDM/ARPF 34 then computes the anchor key ($K_{SEAF\_SRT}$) for the communication between the terminal and the SEAF 31 according to 3GPP TS 33.501, wherein the anchor key is derived from a key ($K_{AUSF\_SRT}$), this key $K_{AUSF\_SRT}$ being derived from $CK_{SRT}$ and $IK_{SRT}$. At step 61, the AUSF/UDM/ARPF 34 sends to the SEAF 31 the authentication vector $AV_{SRT}$. The SEAF 31 stores locally the authentication vector and sends to the terminal 33 (step 62) the RAND and the authentication token AUTN, the RAND and AUTN being contained in the authentication vector computed before accordingly to 3GPP TS 33.501.

At step 63, the UE 33 verifies the validity of received the challenge RAND and authentication token AUTN, the validity verification being performed by the UE 33 by:

- deriving from terminal locally stored long-term key K and the received challenge RAND, the expected authentication token XAUTN, the terminal challenge response RES*, terminal ciphering key CK, terminal integrity key IK as specified in 3GPP TS 33.501 (this corresponds to what already exists in 3GPP TS 33.501);
- generating a second terminal ciphering key $CK_{SRT}$ and a second terminal integrity key $IK_{SRT}$, the second terminal ciphering key being derived from the first terminal ciphering key and the SRT, and the second terminal integrity key being derived from the first terminal integrity key and the SRT;
- computing another terminal anchor key ($K_{SEAF\_SRT}$) for the communication between the terminal and the SEAF 31 according to 3GPP TS 33.501, wherein the another terminal anchor key is derived from a terminal key ($K_{AUSF\_SRT}$), wherein the terminal $K_{AUSF\_SRT}$ is derived from the terminal $CK_{SRT}$ and terminal $IK_{SRT}$.

At step 64, if the verification is successful, the UE 33 sends to the SEAF 31 the challenge response RES* computed by the UE 33.

At step 65, the SEAF derives another HRES* from the received RES* and verifies that the HRES* is equal to the HXRES* contained in the locally stored authentication vector received at step 61.

If the verification is successful, the SEAF 31 sends the successfully checked RES* to the AUSF/UDM/ARPF 34 at step 66. The AUSF/UDM/ARPF 34 verifies at step 67 that the received RES* from the AUSF 31 is equal to the expected challenge response XRES* computed in step 60. If the verification at step 67 is successful, then the UE 33 is considered authenticated by the AUSF/UDM/ARPF 34, and the AUSF/UDM/ARPF 34 sends at step 68 the authentication result and the $K_{SEAF\_SRT}$ computed in step 60 to the SEAF 31, the authentication result indicating the status of the authentication of the terminal accordingly to 3GPP TS 33.501. At step 69, the UE 33 and the SEAF 31 use the $K_{SEAF\_SRT}$ for communication as specified in 3GPP TS 33.501.

The advantage of this second alternative is that it is possible for the Mobile Equipment part of the terminal (instead of the USIM) to perform the derivation of CK and IK based on a SRT, when the USIM is not able to perform the concealment of the SUPI and the SRT into the SUCI (encryption of the SUPI and SRT with AUSF/UDM/ARPF public key).

In this second alternative, the USIM (when capable) is able to perform the derivation of CK and IK based on the SRT, thus making the new process transparent to the terminal.

As said before, the secure registration token is preferably a random number and can be modified by the secure element at each authentication request. Advantageously, the secure registration token is modified by the secure element at each authentication request.

Embodiments of the invention also concern a secure element intended to cooperate with a Mobile Equipment within a terminal in a telecommunication network, the telecommunication network comprising a SEAF and a AUSF/UDM/ARPF, the secure element generating a secure registration token (SRT) sent by the terminal to the AUSF/UDM/ARPF and concealed with the AUSF/UDM/ARPF public key along with its SUPI in the SUCI, in order that AUSF/UDM/ARPF generates an anchor key ($K_{SEAF\_SRT}$) for the communication between the terminal and the SEAF according to 3GPP TS 33.501, wherein the anchor key ($K_{SEAF\_SRT}$) is derived indirectly from a key ($K_{SRT}$) obtained by deriving the long-term key K from the secure element and a secure registration token (SRT) sent by the terminal to the AUSF/UDM/ARPF and concealed with the AUSF/UDM/ARPF public key along with its SUPI in the SUCI.

Embodiments of the invention also concerns an AUSF/UDM/ARPF of a telecommunication network comprising a SEAF and a secure element intended to cooperate with a Mobile Equipment within a terminal in the telecommunication network, the AUSF/UDM/ARPF receiving a secure registration token (SRT) sent by the terminal/secure element and concealed with the AUSF/UDM/ARPF public key along with its SUPI in the SUCI, in order that the AUSF/UDM/ARPF generates an anchor key ($K_{SEAF\_SRT}$) for the communication between the terminal and the SEAF according to 3GPP TS 33.501, wherein the anchor key ($K_{SEAF\_SRT}$) is indirectly derived from a key ($K_{SRT}$) obtained by deriving the long-term key K stored in the secure element and a registration token (SRT) concealed with the AUSF/UDM/ARPF public key and sent by the terminal to the AUSF/UDM/ARPF and concealed with the AUSF/UDM/ARPF public key along with its SUPI in the SUCI.

Unlike all previous 3GPP authentication/registration process (from 2G to current 5G technology), the embodiments of the invention as described uses a Secure Registration Key ($K_{SRT}$) as the basis of the key derivation. This Secure Registration Key is not known by the USIM manufacturer or device manufacturer, and only known by the AUSF/UDM/ARPF and the USIM on the field.

Unlike other solutions contemplated, the embodiments of this invention does not require changes in the intermediate nodes of the network (e.g. SEAF, AMF, Mobile Equipment) and thus can be implemented easily between the home network (AUSF/UDM/ARPF) and the USIM. Unlike other solutions contemplated, the embodiments of the invention uses existing public key assets inside the USIM used for Subscription Identity Privacy already defined in 3GPP TS 33.501, but in case the USIM is not able to perform the SUCI calculation and the Mobile Equipment is capable of providing SUPI privacy then the mechanism can also be performed by the Mobile Equipment part of the UE (second alternative). When supported by the USIM, the invention makes it transparent to the Mobile Equipment.

The invention claimed is:

1. A method for authentication of a secure element cooperating with a terminal in a telecommunication network, said telecommunication network comprising a SEAF and a AUSF/UDM/ARPF, said method comprising:

generating an anchor key ($K_{SEAF\_SRT}$) for communication between said terminal and the SEAF according to 3GPP TS 33.501, wherein said anchor key ($K_{SEAF\_SRT}$) is indirectly derived from a key ($K_{SRT}$) obtained by derivation from a long-term key K and a secure registration token (SRT) sent by said terminal to said AUSF/UDM/ARPF and concealed with a AUSF/UDM/ARPF public key along with its SUPI in a SUCI, the method further comprising:

a. Said terminal performs step of generating said secure registration token (SRT), said SRT is a random number or a sequence number, said sequence number having been increased prior to this process;

b. Said terminal performs step of registering to said AUSF/UDM/ARPF by sending said terminal said SUCI containing encryption of in addition to a subscriber identity of said SUPI, said secure registration token (SRT) via said SEAF;

c. Said AUSF/UDM/ARPF, upon reception of a registration message responsive to said registering, performs step of retrieving said subscriber identity of said SUPI and said SRT, retrieving by said AUSF/UDM/ARPF the long-term key K associated with said subscriber identity of said SUPI;

d. Said AUSF/UDM/ARPF performs step of computing said key $K_{SRT}$, said $K_{SRT}$ is derived from said long-term key K and said SRT, and said AUSF/UDM/ARPF computing an authentication vector ($AV_{SRT}$) based on said SRT and said long-term key K, said authentication vector containing a random challenge RAND, an authentication token $AUTN_{SRT}$, a first expected challenge response $XRES^*_{SRT}$ and a second expected challenge response $HXRES^*_{SRT}$, said $HXRES^*_{SRT}$ is derived from said first expected challenge response $XRES^*_{SRT}$;

e. Said AUSF/UDM/ARPF performs step of computing ean anchor key ($K_{SEAF\_SRT}$) for communication between said terminal and the SEAF according to 3GPP TS 33.501, wherein said anchor key ($K_{SEAF\_SRT}$) is indirectly derived from said key ($K_{SRT}$);

f. Said AUSF/UDM/ARPF performs step of sending to said SEAF said authentication vector $AV_{SRT}$;

g. Said SEAF performs step of storing locally said authentication vector and sending to terminal the random challenge RAND and authentication token $AUTN_{SRT}$, thereby producing a locally stored authentication vector, said random challenge RAND and $AUTN_{SRT}$ are contained in said authentication vector accordingly to 3GPP TS 33.501;

h. Said terminal performs step of verifying the validity of received said random challenge RAND and authentication token $AUTN_{SRT}$, such validity verification is performed by said terminal by:

i. deriving a registration key $K_{SRT}$ based on a locally stored Secure registration token SRT and a locally stored long-term key K, thereby producing a terminal locally stored long-term key that is stored in the secure element and has same value as said long-term key K stored at UDM/ARPF, ii. computing locally an expected $AUTN_{SRT}$ based on said terminal locally stored long-term key and said SRT, and iii. checking said expected $AUTN_{SRT}$ is equal to said $AUTN_{SRT}$ that is received from said SEAF;

i. If said checking step in h.iii is successful, said terminal performs step of computing a challenge response $RES^*_{SRT}$ based on said terminal key $K_{SRT}$ computed in step h.i and said random challenge RAND received;

j. Said terminal performs step of generating another anchor key $K_{SEAF\_SRT}$ for communication between said terminal and said SEAF according to 3GPP TS 33.501, wherein said another anchor key ($K_{SEAF\_SRT}$) is indirectly derived from said $K_{SRT}$ obtained by deriving from said terminal long-term key K and said secure registration token SRT;

k. Said terminal performs step of sending to said SEAF, said challenge response $RES^*_{SRT}$ computed by said terminal;

l. Said SEAF performs step of deriving another $HRES^*_{SRT}$ from received said $RES^*_{SRT}$ and verifying that said $HRES^*_{SRT}$ is equal to said $HXRES^*_{SRT}$ contained in said locally stored authentication vector in step g;

m. If said verification in step l is successful, said SEAF performs step of sending said $RES^*_{SRT}$ checked to said AUSF/UDM/ARPF;

n. Said AUSF/UDM/ARPF performs step of verifying that said received $RES^*_{SRT}$ from AUSF is equal to said first expected challenge response $XRES^*_{SRT}$ computed in step d;

o. If said verification in step n is successful, then said terminal is authenticated by AUSF/UDM/ARPF, and said AUSF/UDM/ARPF sends an authentication result and said $K_{SEAF\_SRT}$ computed in step e to said SEAF, said authentication result indicating a status of authentication of said terminal accordingly to 3GPP TS 33.501; and p. Said terminal and said SEAF thereafter use said another anchor key $K_{SEAF\_SRT}$ for communication as specified in 3GPP TS 33.501.

2. A method for authentication of a secure element cooperating with a terminal in a telecommunication network, said telecommunication network comprising a SEAF and a AUSF/UDM/ARPF, said method comprising:

generating an anchor key ($K_{SEAF\_SRT}$) for communication between said terminal and the SEAF according to 3GPP TS 33,501, wherein said anchor key ($K_{SEAF\_SRT}$) is indirectly derived from a key ($K_{SRT}$) obtained by derivation from a long-term key K and a secure registration token (SRT) sent by said terminal to said AUSF/UDM/ARPF and concealed with a AUSF/UDM/ARPF public key along with its SUPI in a SUCI, the method further comprising:

a. Said terminal performs step of generating said secure registration token (SRT), said SRT is a random number or a sequence number, said sequence number has been increased prior to this process;

b. Said terminal performs step of registering to said AUSF/UDM/ARPF by sending said SUCI of said terminal containing encryption of in addition to said SUPI identifying said terminal, said secure registration token (SRT) via said SEAF;

c. Said AUSF/UDM/ARPF upon reception of a registration message responsive to said registering, performs step of retrieving a subscriber identity of said SUPI and said SRT, retrieving by said AUSF/UDM/ARPF the long-term key K associated with said subscriber identity of said SUPI;

d. Said AUSF/UDM/ARPF performs step of generating a random challenge RAND, deriving from said long-term key K and said random challenge RAND, an authentication token AUTN, a first expected challenge response XRES*, a first ciphering key CK, a first integrity key IK and a second expected challenge response HXRES*, said HXRES* being derived from first expected challenge response XRES* as specified in 3GPP TS 33.501;

e. Said AUSF/UDM/ARPF performs step of generating a second ciphering key $CK_{SRT}$ and a second integrity key $IK_{SRT}$, said second ciphering key $CK_{SRT}$ is derived from the first ciphering key CK and said SRT, and said second integrity key $IK_{SRT}$ derived from said first integrity key IK and said SRT;

f. Said AUSF/UDM/ARPF performs step of computing an anchor key ($K_{SEAF\_SRT}$) for communication between said terminal and the SEAF according to 3GPP TS 33.501, wherein said anchor key is derived from a key ($K_{AUSF\_SRT}$), wherein said $K_{AUSF\_SRT}$ is derived from said $CK_{SRT}$ and $IK_{SRT}$;

g. Said AUSF/UDM/ARPF performs step of sending to said SEAF an authentication vector $AV_{SRT}$;

h. Said SEAF performs step of storing locally said authentication vector and sending to said terminal said random challenge RAND and said authentication token AUTN, thereby producing a locally stored authentication vector, said random challenge RAND and AUTN are contained in said authentication vector accordingly to 3GPP TS 33.501 computed in step g;

i. Said Terminal performs step of verifying validity of received said random challenge RAND and authentication token AUTN, such validity verification is performed by said terminal by:

i. deriving from terminal locally stored long-term key K and said random challenge RAND received, an expected authentication token XAUTN, a terminal challenge response RES*, a first terminal ciphering key CK, a first terminal integrity key IK as specified in 3GPP TS 33.501;

ii. Terminal-generating a second terminal ciphering key $CK_{SRT}$ and a second terminal integrity key $IK_{SRT}$, said second terminal ciphering key is derived from the first terminal ciphering key and said SRT, and said second terminal integrity key is derived from said first terminal integrity key and said SRT;

iii. computing another terminal anchor key ($K_{SEAF\_SRT}$) for the communication between said terminal and the SEAF according to 3GPP TS 33.501, wherein said another terminal anchor key is derived from a terminal key ($K_{AUSF\_SRT}$), wherein said terminal key ($K_{AUSF\_SRT}$) is derived from said terminal ciphering key $CK_{SRT}$ and terminal integrity key $IK_{SRT}$;

j. If said verification in step i is successful, said terminal performs step of sending to said SEAF, said terminal challenge response RES* computed by said terminal;

k. Said SEAF performs step of deriving another HRES* from received said RES* and verifying that said another HRES* is equal to said HXRES* contained in said locally stored authentication vector in step h;

l. If said verification in step k is successful, said SEAF performs step of sending said RES* successfully checked to said AUSF/UDM/ARPF;

m. Said AUSF/UDM/ARPF performs step of verifying that said RES* received in step l from said AUSF is equal to said first expected challenge response XRES* computed in step d;

n. If said verification in step m is successful, then said terminal is authenticated by AUSF/UDM/ARPF, and said AUSF/UDM/ARPF performs the step of sending an authentication result and said $K_{SEAF\_SRT}$ computed in step f to said SEAF, said authentication result indicating a status of authentication of said terminal accordingly to 3GPP TS 33.501; and o. Said terminal and said SEAF thereafter use said $K_{SEAF\_SRT}$ for communication as specified in 3GPP TS 33.501.

3. A method according to claim 1 or 2, wherein said secure registration token is a random number.

4. A method according to claim 1 or 2, wherein said secure registration token is modified by said secure element at each authentication request.

5. The method of claim 1 or 2, wherein said secure element performs step of:
generating said secure registration token (SRT) sent by said terminal to said AUSF/UDM/ARPF and concealed with said AUSF/UDM/ARPF public key along with its SUPI in said SUCI, in order that said AUSF/UDM/ARPF operates said anchor key ($K_{SEAF\_SRT}$) for communication between said terminal and said SEAF according to 3GPP IS 33.501.

6. The method of claim 5, wherein said AUSF/UDM/ARPF performs step of:
receiving said secure registration token (SRT) sent by said secure element along with its SUPI concealed in said SUCI, in order that said AUSF/UDM/ARPF generates said anchor key ($K_{SEAF\_SRT}$) for communication between said terminal and said SEAF according to 3GPP TS 33.501.

* * * * *